(12) United States Patent
Hampton et al.

(10) Patent No.: US 10,317,934 B2
(45) Date of Patent: Jun. 11, 2019

(54) GEARING SOLUTION FOR AN EXTERNAL FLEXIBLE SUBSTRATE ON A MULTI-USE PRODUCT

(71) Applicant: Dell Products, LP, Round Rock, TX (US)

(72) Inventors: Patrick Hampton, Round Rock, TX (US); Gerald R. Pelissier, Round Rock, TX (US); George Tzeng, Hsinchu (TW); John Trevor Morrison, Round Rock, TX (US); Alpha Y F Cheng, New Taipei (TW)

(73) Assignee: Dell Products, LP, Round Rock, TX (US)

( * ) Notice: Subject to any disclaimer, the term of this patent is extended or adjusted under 35 U.S.C. 154(b) by 47 days.

(21) Appl. No.: 14/613,915

(22) Filed: Feb. 4, 2015

(65) Prior Publication Data
US 2016/0227645 A1   Aug. 4, 2016

(51) Int. Cl.
| H05K 1/02 | (2006.01) |
| H05K 5/02 | (2006.01) |
| H05K 5/00 | (2006.01) |
| G06F 1/16 | (2006.01) |
| H05K 1/18 | (2006.01) |

(52) U.S. Cl.
CPC .......... *G06F 1/1601* (2013.01); *G06F 1/1616* (2013.01); *G06F 1/1652* (2013.01); *G06F 1/1681* (2013.01)

(58) Field of Classification Search
CPC .... H05K 1/0281; H05K 5/0217; H05K 1/181; H05K 5/0017; H05K 2201/10128; G06F 1/1601

USPC ...................................................... 361/679.21
See application file for complete search history.

(56) References Cited

U.S. PATENT DOCUMENTS

| 3,483,588 A * | 12/1969 | Hover ..................... B63B 19/19 |
| | | 16/354 |
| 6,094,341 A | 7/2000 | Lin |
| 6,577,496 B1 * | 6/2003 | Gioscia ................. G06F 1/1616 |
| | | 345/156 |
| 7,032,984 B2 * | 4/2006 | Kim ...................... G06F 1/1601 |
| | | 312/223.2 |
| 7,136,282 B1 | 11/2006 | Rebeske |
| 7,353,053 B2 * | 4/2008 | Prichard .............. G06F 1/1624 |
| | | 379/433.01 |

(Continued)

FOREIGN PATENT DOCUMENTS

| WO | WO 2012/044516 A2 | 4/2012 |
| WO | WO 2013/107318 A1 | 7/2013 |

OTHER PUBLICATIONS

N. Ravi, J. Scott, H. Lu, L. Iftode, "Context-aware Battery Management for Mobile Phones," In Pervasive Computing and Communications, p. 224-233, 2008, p. 1-10.

(Continued)

*Primary Examiner* — Rockshana D Chowdhury
(74) *Attorney, Agent, or Firm* — Prol Intellectual Property Law, PLLC; H. Kenneth Prol (57) ABSTRACT

An information handling system a flexible display screen, first and second display platforms, and a rack gear component. The flexible display screen is movably mounted to the first and second display platforms. The rack gear component is mounted between the first and second display platforms, and controls support of the flexible display screen.

20 Claims, 6 Drawing Sheets

(56) References Cited

U.S. PATENT DOCUMENTS

| | | | |
|---|---|---|---|
| 7,821,780 B2 | 10/2010 | Choy | |
| 8,102,675 B2* | 1/2012 | Kilpinen | G06F 1/1616 361/679.26 |
| 8,411,427 B2* | 4/2013 | Jeong | H04M 1/0216 361/679.26 |
| 8,787,016 B2* | 7/2014 | Rothkopf | H04M 1/0216 361/679.55 |
| 2003/0142469 A1 | 7/2003 | Ponx | |
| 2005/0237269 A1 | 10/2005 | Connor et al. | |
| 2006/0026535 A1 | 2/2006 | Hotelling et al. | |
| 2006/0109259 A1 | 5/2006 | Ohta | |
| 2008/0144265 A1* | 6/2008 | Aoki | G06F 1/1601 361/679.04 |
| 2009/0296331 A1 | 12/2009 | Choy | |
| 2010/0031203 A1 | 2/2010 | Morris et al. | |
| 2011/0032199 A1 | 2/2011 | Seo et al. | |
| 2012/0243207 A1* | 9/2012 | Wang | G09F 9/30 362/97.1 |
| 2012/0314400 A1* | 12/2012 | Bohn | G09F 9/301 362/97.1 |
| 2013/0058063 A1* | 3/2013 | O'Brien | G06F 1/1624 361/807 |
| 2013/0070431 A1* | 3/2013 | Fukuma | G06F 1/1652 361/749 |
| 2013/0127905 A1 | 5/2013 | Zhang et al. | |
| 2013/0201101 A1 | 8/2013 | Niu et al. | |
| 2013/0342090 A1* | 12/2013 | Ahn | G09F 9/33 312/258 |
| 2013/0342094 A1 | 12/2013 | Walters | |
| 2014/0009445 A1 | 1/2014 | Kim et al. | |
| 2014/0111954 A1 | 4/2014 | Lee | |
| 2014/0247198 A1 | 9/2014 | Yang et al. | |
| 2014/0355195 A1* | 12/2014 | Kee | G06F 1/1616 361/679.27 |
| 2015/0023031 A1* | 1/2015 | Endo | H01L 27/323 362/427 |
| 2015/0361696 A1* | 12/2015 | Tazbaz | H04M 1/022 361/679.27 |

OTHER PUBLICATIONS

Marek Novotny, "Microsensors for Contactless Angle Sensing," Sep. 23, 2014 http://www.ac.tut.fi/aci/courses/ACI-51106/pdf/Angle/AngleSensing.pdf, p. 1-9.

"This End Up: Using Device Orientation," By Pete LePage, Apr. 29, 2011, http://www.html5rocks.com/en/tutorials/device/orientation/, p. 1-17.

Sony Tablet p—Dual screen for maximum mobility, Get more done on the go with two 13.9 cm (5.5") touch screens, 1GB RAM, MicroSD card storage, ultra light and compact design, Wi-Fi and 3G, http://www.sony.co.uk/product/sony-tablet-p/tab/overview, p. 1-12.

"NEC Unveils Bizarre Dual-Screen Medias W N-05E," CNET Editor's Take, Aug. 28, 2013, http://www.cnet.com/products/nec-medias-w-n-05e/, p. 1-8.

"Position Sensors; Android Developers," Sep. 6, 2013; http://developer.android.com/guide/topics/sensors/sensors_position.html, p. 1-5.

"Passive and Active Cooling Modes," Oct. 12, 2013, http://msdn.microsoft.com/en-us/library/windows/hardware/hh698271(v=vs.85).aspx, p. 1-2.

"A Procedure for Developing Intuitive and Ergonomic Gesture Interfaces for Man-Machine Interaction," M. Nielsen et al., Aalborg University, Laboratory of Computer Vision and Media Technology, Denmark, Technical Report CVMT 03-01, ISSN 1601-3646, CVMT, Aalborg University, Mar. 2003, pp. 1-12.

"Hidden Apple Patent for Flexible Display Devices Discovered," Patently Apple, Jan. 11, 2014, http://www.patentlyapple.com/patently-apple/2014/01/hidden-apple-patent-for-flexible-display-devices-discovered.html, p. 1-12.

"Apple Patents iPad Smart Magnets, used to Attach Gizmos Like Controllers or Cameras," James A., Feb. 20, 2014, https://tablet-news.com/apple-patents-ipad-smart-magnets-used-to-attach-gizmos-like-controllers-or-cameras/, p. 1-3.

"Apples's Wrap-Around Display Tech Could Kill Off Those Pesky Bezels [Patent]," Luke Dormehl, Feb. 13, 2014, https://www.cultofmac.com/266383/apples-wrap-around-display-tech-kill-pesky-bezels-patent/, p. 1-8.

"Talk about Timing: Apple's iWatch Patent Arrives," Patently Apple, Feb. 21, 2013, http://www.patentlyapple.com/patently-apple/2013/02/talk-about-timing-apples-wristwatch-patent-arrives.html, p. 1-6.

"Power-Saving Color Transformation of Mobile Graphical User Interfaces on OLED-based Displays," M. Dong et al., Aug. 19, 2009, p. 1-4.

* cited by examiner

GEARING SOLUTION FOR AN EXTERNAL FLEXIBLE SUBSTRATE ON A MULTI-USE PRODUCT

FIELD OF THE DISCLOSURE

The present disclosure generally relates to a gearing solution for an external flexible substrate on a multi-use product.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as clinical healthcare data storage and distribution, financial transaction processing, procurement, stocking and delivery tracking, provision of data services and software, airline reservations, enterprise data storage, or global communications. Information handling systems may include a variety of hardware and software components that may be configured to process, store, and communicate information and may include one or more computer systems, data storage systems, and networking systems. Additionally, information handling systems may have two or more display platforms with one or more display screens to output images. The information handling system can bend to create different sizes of the display.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of architectures such as distributed computing architectures, client or server architectures, or middleware server architectures and associated components.

Most businesses and other enterprises have sophisticated computing systems used for facilitating internal operations and for storing sensitive data, protecting access to such data, and securely communicating outside the enterprise's network, for example to exchange information with business partners, healthcare providers or similar data exchange partners. These enterprise systems also interface with individual users. Individual users also use sophisticated computing systems to facilitate working software application contexts such as running office applications for database creation and word processing, note taking, accessing internet data applications, gaming, video playback entertainment, video and voice communications, email and other electronic communication, websurfing, music, mobile applications, and other media accesses. Much of present day information exchange is conducted electronically, via communications networks. Currently, a high degree of media entertainment and other applications are utilized and accessed electronically by users. Thus, there is an increased need for extended display capabilities to facilitate broad range of usage including to enable multitasking by users. Additionally, traditional information handling system input devices such as keyboards and mouse systems are giving way to visual input interfaces such as touchscreens, hover detection, and motion sensing technologies. In many instances, it is substantially beneficial to implement a system with multiple display platforms having one or more display screens configurable in many orientations to interact with an information handling system.

For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Multiple display platform information handling systems may be configurable in a plurality of orientations for utilization of and interaction with the information handling system. Hereinafter, the terms dual display screen information handling system or dual display information handling systems, or dual display platform information handling system each may refer to devices with a single display screen such as a flexible display that is layered over or mounted on all or part of two or more display platforms, or each may refer to devices with two or more fully integrated display screens, or each may refer to devices with a plurality of separate display screens that are modularly connectable to the information handling system or to one another. The terms screen or display screen may also refer to a portion of a single display screen, such as a flexible display screen, with a plurality of portions or to an individual display screen. Screens or display screens may herein refer to portions of a display screen and may be mounted on or integrated into one or more display platforms. It is understood that while two display platforms are disclosed in several embodiments herein, embodiments including a plurality of display platforms including three or more display platforms in hinged relationship is also contemplated for the systems and methods disclosed herein. One of ordinary skill would understand implementing the systems and method embodiments discussed herein for these additional embodiments.

FIGS. 1-5 show an information handling system including two hinged display platforms, a flexible display screen, and a rack gear component. The rack gear component includes a flexible substrate, a rack, and multiple gear components. The rack gear component is placed in physical communication with both of the display platforms and with the flexible display screen, such that the rack gear component is located in between the display platforms and the flexible display screen. In an embodiment, a first gear component is securely mounted to a first display platform, and a second gear component is securely mounted to a second display platform. In an embodiment, the flexible substrate can be moveably mounted to the display platforms, such that as the display platforms rotate from one position to the next, the edges of flexible substrate can slide along one or both of the display platforms to compensate for the change in distance between the display platforms.

When the display platforms are in the open position, the rack is located in a first position with respect to the gear components and the display platforms. In an embodiment, the first position of the rack can align a top portion of the rack with a top surface of the display platforms, such that the flexible substrate and the flexible display screen are substantially flat. While the information handling system is in the open position, the rack gear component, via the flexible substrate, can provide support to the flexible display screen. As the display platforms rotate from the open position to the closed position, the gear components exert a force on the rack to cause the rack to rise up with respect to the display platforms. In an embodiment, as the rack is forced up by the gear components, the center of the flexible substrate is also forced upward. When the display platforms are in the closed position, the gear components place the rack in a second position within the rack gear component. In the second position, the rack is fully extended from the gear components, and the rack pushes on the flexible substrate to control the height of the flexible substrate, and thereby the flexible display screen, from the gear components of the information handling system.

Figure 6:
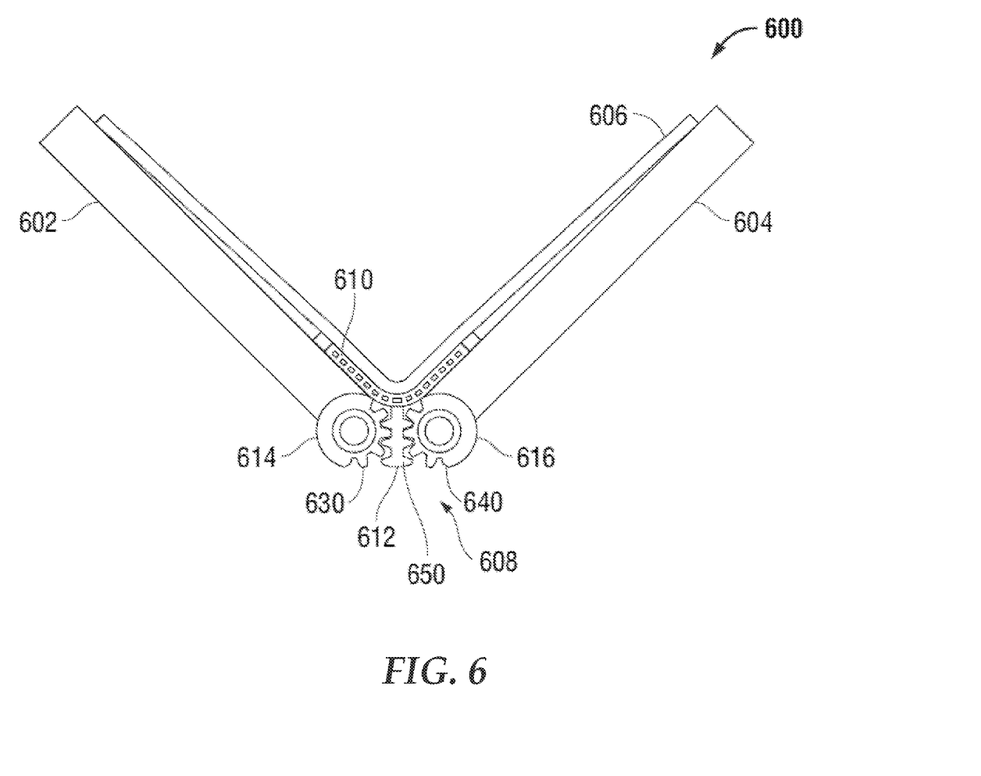
FIG. 6 is a diagram of the portion while the information handling system is in a reader position according to an embodiment of the present disclosure.

In an embodiment, the information handling system can rotate from the open position to the reader position. In this embodiment, gear components can apply a force to the rack, which causes the rack to move to a third position within the rack gear component. When the rack is in the third position the rack can be located below the gear components. This position of the rack also causes the flexible substrate and the flexible display screen to pull toward the rack. This may assist in keeping the display screen operatively coupled to the flexible substrate in a flat position relative to the display platforms. In this way lifting or bowing of the flexible substrate may be avoided. Thus, the rack can be held at any one of a number of positions within the rack gear component, such as a first position when the display platforms are in an open position, a second position when the display platforms are in a closed position, and a third position when the display platforms are in a reader position.

Figure 1:
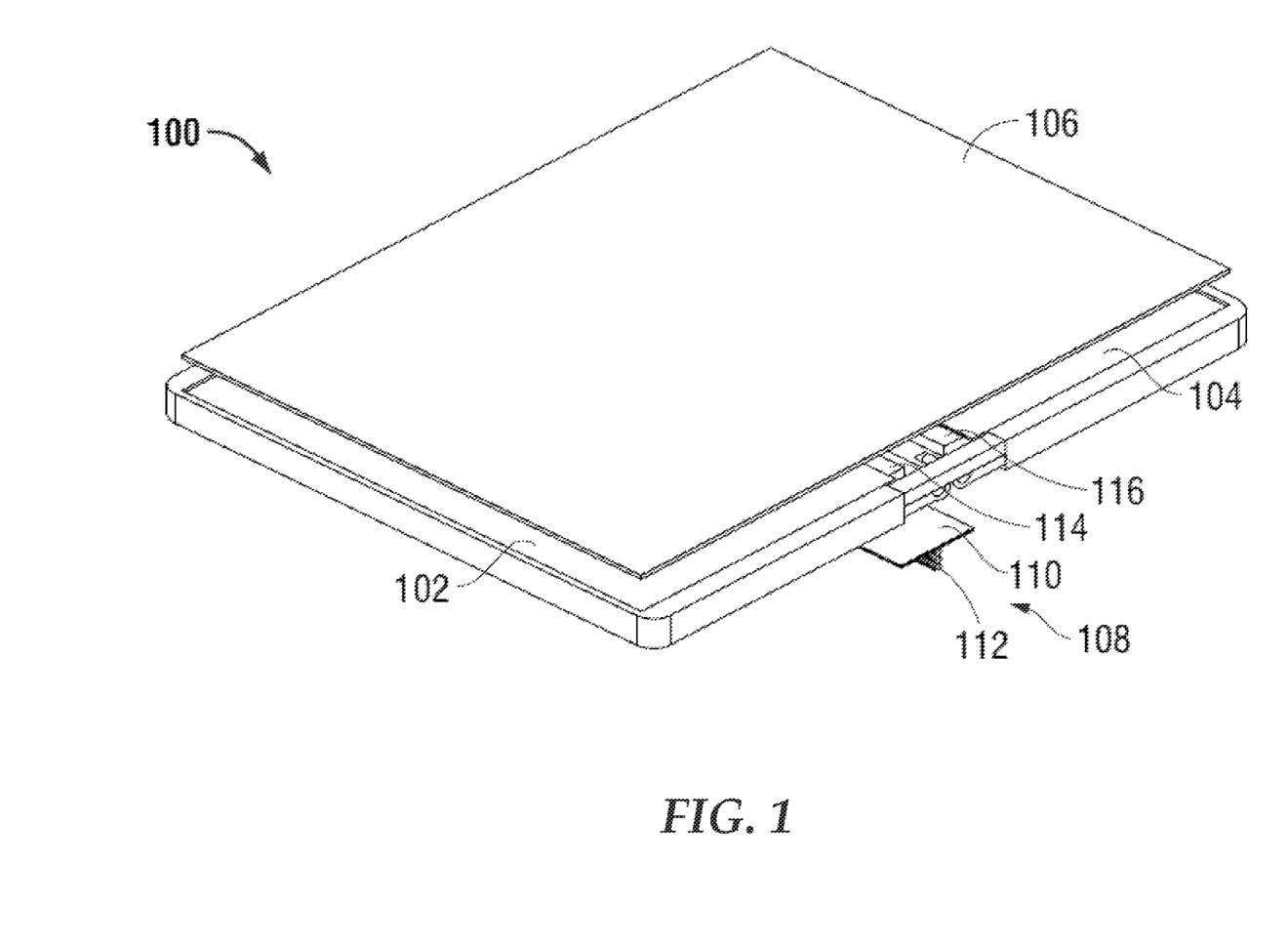
FIG. 1 is a diagram of an expanded view an information handling system in an open position according to an embodiment of the present disclosure.

FIG. 1 shows an expanded view of an embodiment of a dual display platform information handling system 100 with two hinged display platforms 102 and 104 according to an embodiment of the present disclosure. In this embodiment, the information handling system 100 includes display platforms 102 and 104, a flexible display screen 106, and a rack gear component 108. The rack gear component 108 may include a flexible substrate 110, a rack 112, and one or more gear components 114 and 116. In an embodiment, the rack gear component 108 may include only the flexible substrate 110 and the rack 112. In an embodiment, the rack gear component 108 may include only the rack 112 and one of the gear components 114 and 116. Thus, it is understood that the rack gear component 108 may include any combination of the flexible substrate 110, the rack 112, and one or more gear components 114 and 116.

In an embodiment, display platforms 102 and 104 may include housings to contain underlying electronics and power components of the information handling system 100. Accordingly for the described embodiment, housings may be used interchangeably with display platforms. In an embodiment, the flexible display screen 106, such as a flexible active-matrix organic LED (AMOLED) display, may be mounted over or into display platforms 102 and 104. In the example embodiment, the display screen 106 may be mounted to and supported by the display platforms 102 and 104. The mounted flexible display screen 106 may be movably mounted to display platforms 102 and 104. In other words, mounted flexible display screen 106 may be able to slide or otherwise move with respect to one or both of the display platforms 102 and 104.

As illustrated in FIG. 1, the information handling system 100 is in a landscape page orientation, or open position, and the display platforms 102 and 104 are substantially inline with each other. In FIG. 1, the flexible substrate 110 and rack 112 have been illustrated below the display platforms 102 and 104, such that the gear components 114 and 116 may be visible. However, in operation, the flexible substrate 110 of the rack gear component 108 is placed in physical communication with the display platforms 102 and 104. In this embodiment, the flexible substrate 110 extends from display platform 102, across the gear components 114 and 116, and onto display platform 104. While the information handling system 100 is in the open position, the display platforms 102 and 104 can be aligned with each other and the rack gear component 108, via the flexible substrate 110, can provide support to the flexible display screen 106. The display platforms 102 and 104, the flexible display screen 106, and the rack gear component 108 are operatively interconnected to provide support to the display screen as shown in greater detail in FIG. 2.

Figure 2:
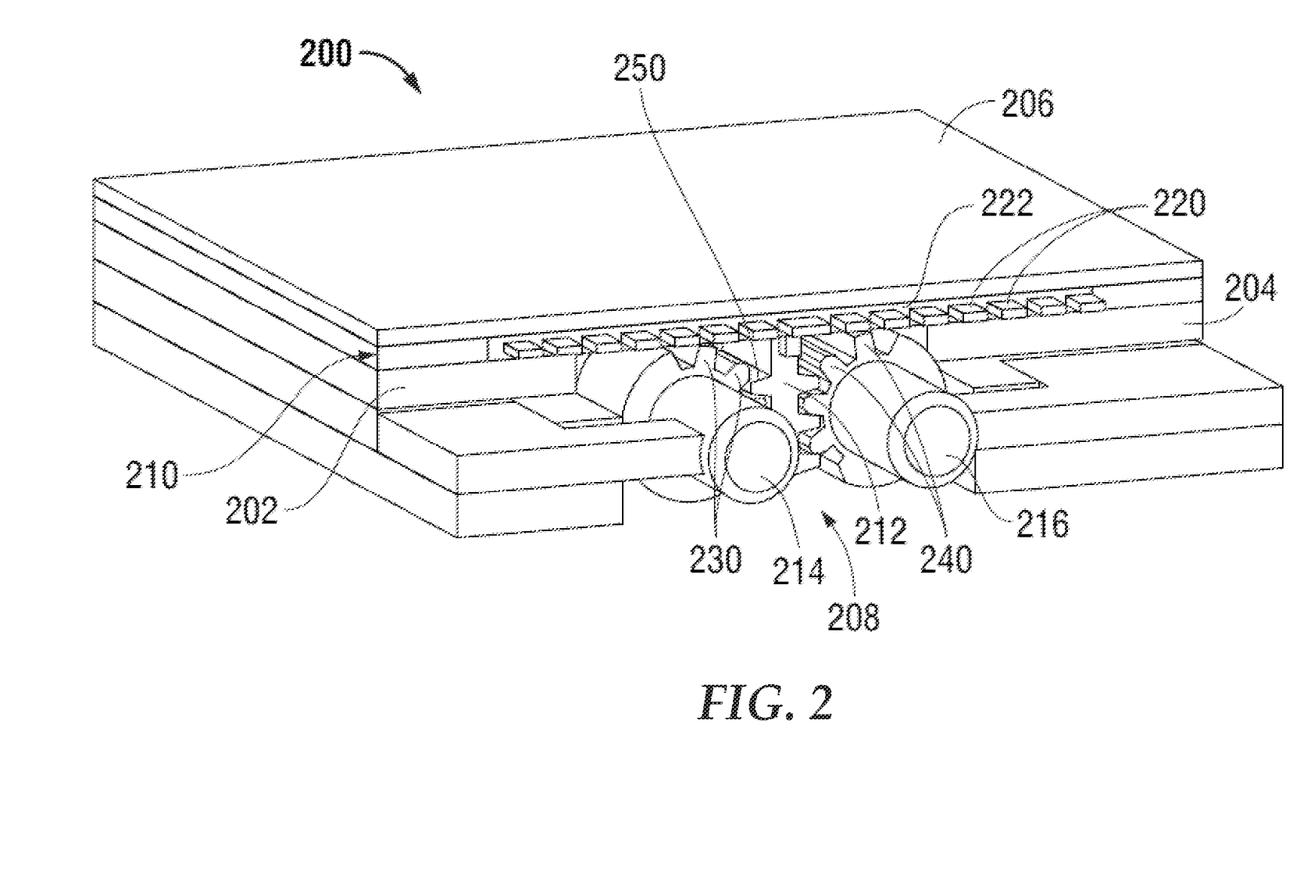
FIG. 2 is a diagram of a portion of the information handling system in the open position according to an embodiment of the present disclosure.

FIG. 2 illustrates a portion of an information handling system 200 in an open position according to an embodiment of the present disclosure. In this embodiment, the information handling system 200 includes display platforms 202 and 204, a flexible display screen 206, and a rack gear component 208. The rack gear component 208 includes a flexible substrate 210, a rack 212, and gear components 214 and 216. As illustrated in the embodiment of FIG. 2, the flexible substrate 210 may include multiple rigid supports 220, which in turn are surrounded by a flexible material 222. In an embodiment, the rigid supports 220 are made from a very durable material, such as spring steel, or the like. In this embodiment, the rigid supports 220 can provide localized stiffness in the bend region. In an embodiment, the flexible material 222 can be a flexible silicon based material, rubber, or the like. In this embodiment, the flexible material 222 can provide flexibility to the flexible substrate 210 when attached between the rigid supports 220. In an embodiment, the rigid supports 220 provide strength to flexible substrate 210, which in turn provides support to the flexible display screen 206. However, in an embodiment, the rigid supports 220 can be separated by a specific distance to allow the flexible substrate 210 and the flexible display 206 to bend as the display platforms 202 and 204 rotate from the open position to either a closed position or a reader position.

In an embodiment, when the display platforms 102 and 104 are in the closed position the bottom surfaces of the display platforms are substantially in physical contact with each other, such that the display platforms 102 and 104 are on top of each other. In an embodiment, the display platforms 102 and 104 are placed in the reader position by the top surfaces of the display platforms 102 and 104 (e.g., the surfaces of the display platforms that are in physical communication with the flexible display screen 106) being placed closer together as compared to when the display platforms 102 and 104 are in the open position.

In an embodiment, the gear component 214 is securely mounted to the display platform 202, and the gear component 216 is securely mounted to the display platform 204. In an embodiment, the gear component 214 includes multiple teeth 230 that point away from the display platform 202 and toward the display platform 204 and the flexible display screen 206. In an embodiment, the gear component 216 includes multiple teeth 240 that point away from the display platform 204 and toward the display platform 202 and the flexible display screen 206. In an embodiment, the rack 212 includes multiple teeth 250 that are placed in physical communication with the teeth 230 of gear component 214 and with the teeth 240 of gear component 216.

In an embodiment, the gear component 214 may include multiple indentions extending back into the gear component, and the teeth 250 of the rack 212 can be inserted into different indentions of the gear component 214 as the rack 212 is moved from one position to another. In an embodiment, the gear component 216 may include multiple indentions extending back into the gear component, and the teeth 250 of the rack 212 can be inserted into different indentions of the gear component 216 as the rack 212 is moved from one position to another.

In an embodiment, the rack 212 may include teeth 250 on only one side of the rack that can operatively coupled to the teeth of one of the gear components 214 or 216, and the other side of the rack 212 may be substantially flat and smooth. In this embodiment, the flat side of the rack 212 can interface with a gear component that is also smooth, such that the smooth gear component can provide support to the rack 212. In an embodiment, the rack 212 can include indentions instead of teeth, and the indentions can be located on one or both of the sides of the rack 212. In this embodiment, the indentions of the rack 212 can interface with the teeth of one or both of the gear components 214 and 216 as the rack 212 is moved from one position to another.

Figure 3:
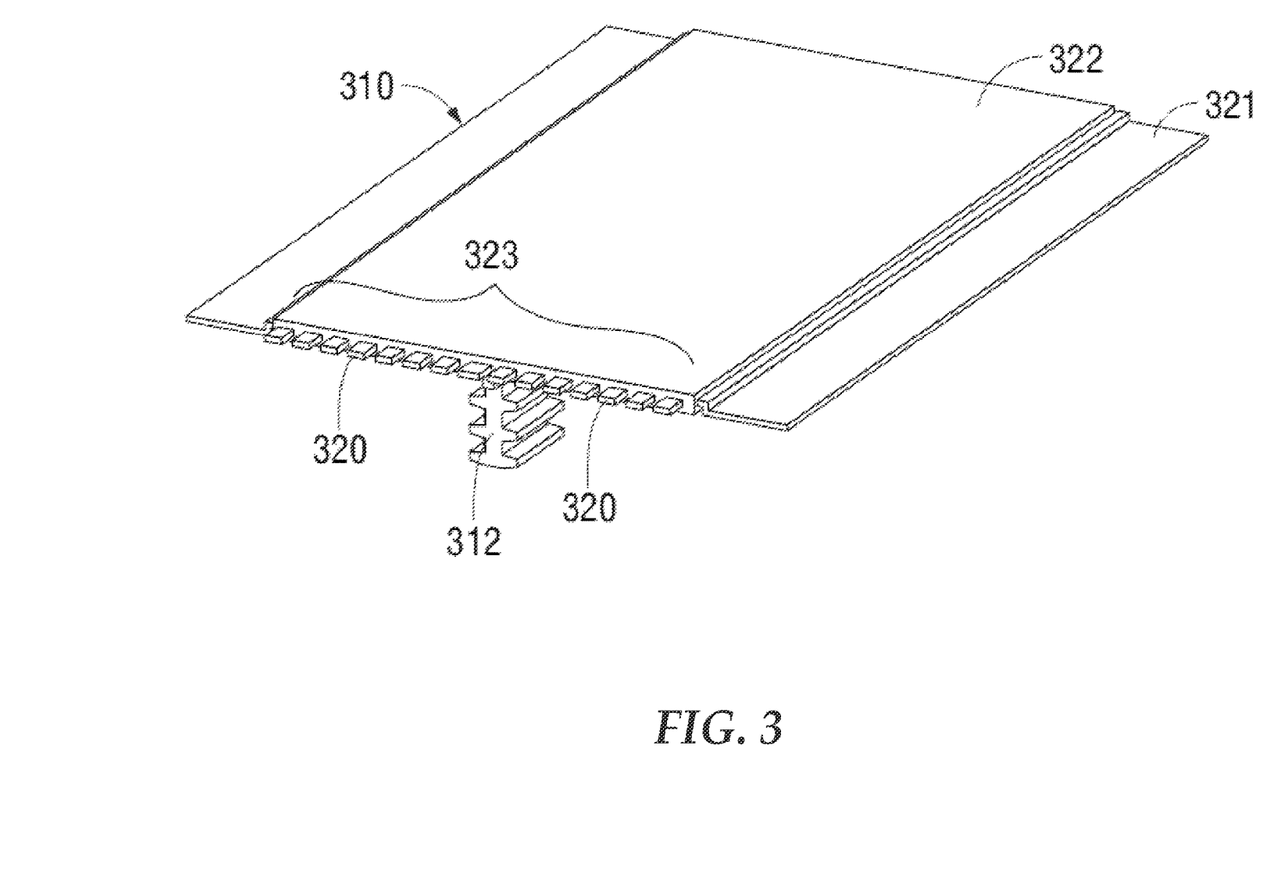
FIG. 3 is a diagram of a flexible substrate of the information handling system according to an embodiment of the present disclosure.

FIG. 3 shows a flexible substrate 310 and a rack 312 that can be securely mounted to a bottom surface of the flexible substrate. The flexible substrate includes rigid supports 320, a frame 321, and a flexible material 322. In an embodiment, the rigid supports 320 and the frame 321 are formed from a single piece of material that provides strength to the flexible substrate 310. In this embodiment, the rigid supports 320 extend from the frame 321 in a region 323 of the flexible substrate 310 that is bent while the display platforms 202 and 204 of information handling system 200 are in the closed position. As illustrated in FIG. 3, the flexible material 322 can be located around portions of the frame 321 and in between the rigid supports 320 in the region 323. The flexible material 322 can provide protection to the flexible display screen 206 from the frame 321 and the rigid supports 320 of the flexible substrate 310, such that the frame 321 and rigid supports 320 do not come in contact with the flexible display 206 when the display platforms 202 and 204 rotate from the open position to the closed position.

In another embodiment, the rigid supports 320 are each individual pieces of material that are held in place within region 323 by the flexible material 322 or may be attached to the flexible material 322. Similarly, the flexible material 322 can connect with both portions of the frame 321 to form the region 323, e.g., the region of the flexible substrate 310 that bends as the display platforms 202 and 204 rotate from the open position to either a reader position or a closed position. In an embodiment, the rigid supports 320 can be attached to a bottom surface of the flexible material 322, e.g., on the surface of operatively coupled to the rack 312. In an embodiment, the rigid supports 320 can be attached to a top surface of the flexible material 322, e.g., on the surface of opposite of the rack 312. In an embodiment, the frame 321 can be moveably connected to the display platforms 102 and 104, such that as the display platforms 102 and 104 rotate from one position to the next, the edges of frame 321 can slide along one or both of the display platforms to compensate for the change in distance between the display platforms.

Referring back to FIG. 2, when the display platforms 202 and 204 are in the open position, the rack 212 is located in a first position with respect to the gear components 214 and 216 and the display platforms 202 and 204. In an embodiment, the first position of the rack 212 can align a top portion of the rack with a top surface of the display platforms 202 and 204, such that the flexible substrate 210 and the flexible display screen 206 are substantially flat. Thus, while the display platforms 202 and 204 are in the open position, the rack 212 of the rack gear component 208 can provide control to the flexible substrate 210 to cause the flexible display screen 206 to be substantially flat for viewing by an individual. As the display platforms 202 and 204 rotate from the open position to the closed position, the teeth 230 and 240 exert a force on the rack 212 to cause the rack 212 to rise up with respect to the display platforms 202 and 204 and push out on the flexible display screen 206 as will be described with respect to FIG. 4.

Figure 4:
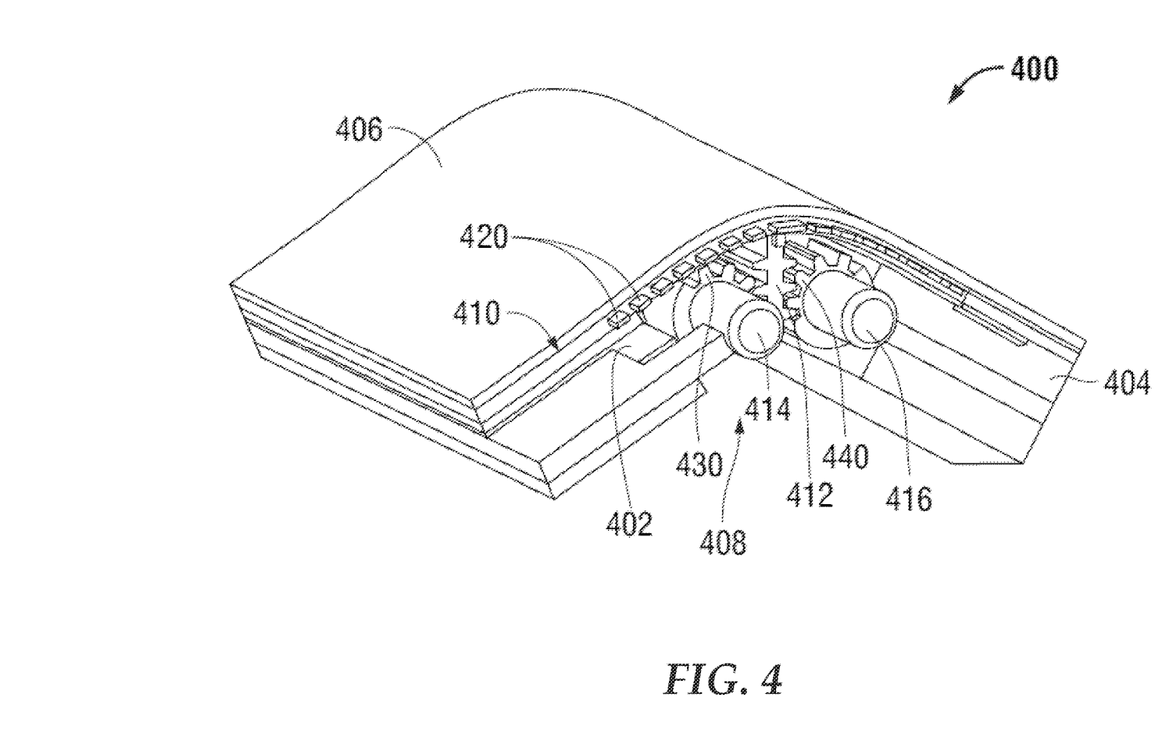
FIG. 4 is a diagram of the portion while the information handling system is in an intermediate position according to an embodiment of the present disclosure.

FIG. 4 illustrates a portion of an information handling system 400 in an intermediate position in between the open position and the closed position according to an embodiment of the present disclosure. In this embodiment, the information handling system 400 includes display platforms 402 and 404, a flexible display screen 406, and a rack gear component 408. The rack gear component 408 includes a flexible substrate 410, a rack 412, and gear components 414 and 416. The gear component 414 includes teeth 430, which in turn are in physical communication with teeth 450 of the rack 412. The gear component 416 includes teeth 440, which in turn are in physical communication with teeth 450 of the rack 412. The flexible substrate 410 may include rigid supports 420, and a flexible material 422. As illustrated in the embodiment of FIG. 4, the display platforms 402 and 404 are positioned so that the bottom surfaces of the display platforms 402 and 404 are closer together as compared to when the information handling system 400 is in an open position.

As the display platforms 402 and 404 are rotated from the open position to the closed position, the gear components 414 and 416 rotate with the display platforms and as a result the teeth 430 and 440 force the rack 412 to lift up with respect to the display platforms 402 and 404. As described above with respect to FIG. 3, the rack 412 can be physically mounted on the flexible substrate 410 so that as the rack 412 is forced up by the teeth 430 and 440 the center of the flexible substrate 410 is also forced upward. In this embodiment, the flexible substrate 410 and the flexible display screen 406 are both pushed based on a distance the rack 412 is shifted upward by the gear components 414 and 416.

In this embodiment, the rigid supports 420 and the flexible material 422 combine together to form the flexible substrate 410 and to control the shape of the flexible display screen 406. For example, the rack 412 is pressed upward in the middle of the flexible substrate 410, such that the flexible material 422 curves from the center to the frame 321 shown in FIG. 3. As described above, the frame, such as frame 321 of FIG. 3, of the flexible substrate 410 can slide along one or both of the display platforms 402 and 404 to reduce any stress on the flexible substrate 410 while distance between the display platforms increases and while the flexible substrate 410 provides support to the flexible display screen 406.

Figure 5:
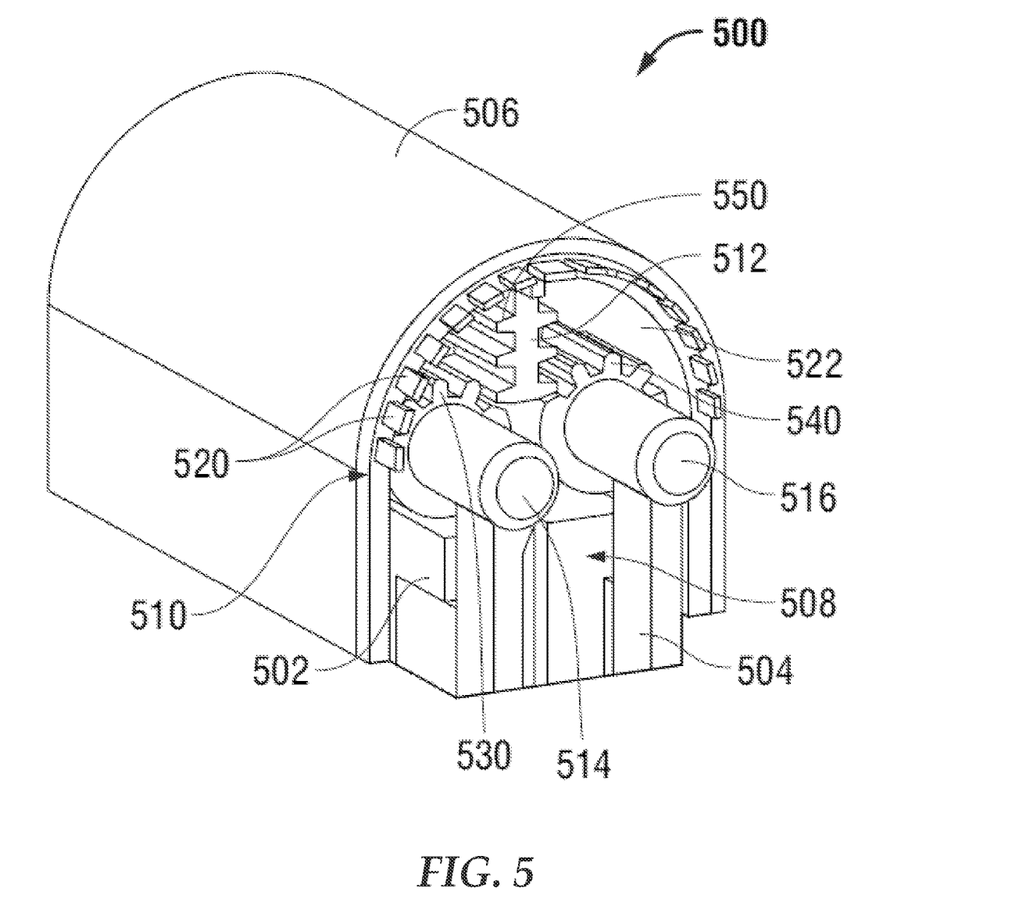
FIG. 5 is a diagram of the portion while the information handling system is in a closed position according to an embodiment of the present disclosure.

FIG. 5 is a diagram of a portion of an information handling system 500 in a closed position according to an embodiment of the present disclosure. In this embodiment, the information handling system 500 includes display platforms 502 and 504, a flexible display screen 506, and a rack gear component 508. The rack gear component 508 may include a flexible substrate 510, a rack 512, and one or more gear components 514 and 516. As illustrated in the embodiment of FIG. 5, the display platforms 502 and 504 are placed in the closed position. In the closed position, the bottom surfaces of the display platforms 502 and 504 are placed in physical communication with each other.

When the display platforms 502 and 504 are in the closed position, the gear components 514 and 516 place the rack 512 in a second position within the rack gear component 508. In the second position, the rack 512 is fully extended from the teeth 530 of gear component 514 and from the teeth 540 of the gear component 516. The rack 512 pushes on the flexible substrate 510 to control the height of the flexible substrate, and thereby the flexible display screen 506, from the gear components 514 and 516 of the information handling system 500. This may provide support to a display screen folded over the hinge between two display platforms.

FIG. 6 is a diagram of a portion of an information handling system 600 in a closed position according to an embodiment of the present disclosure. In this embodiment, the information handling system 600 includes display platforms 602 and 604, a flexible display screen 606, and a rack gear component 608. The rack gear component 608 may include a flexible substrate 610, a rack 612, and one or more gear components 614 and 616. As illustrated in the embodiment of FIG. 6, the display platforms 602 and 604 are placed in a reader position. In the reader position, the top surfaces of the display platforms 602 and 604, e.g., the surfaces nearest to the flexible display screen 606, are closer together than when the display platforms 602 and 604 are in the open position.

In an embodiment, the information handling system 600 can rotate from the open position to the reader position. In this embodiment, the teeth 630 of gear component 614 and the teeth 640 of the gear component 616 apply a force to the teeth 650 of the rack 614, which causes the rack to move to a third position within the rack gear component. When the rack 612 is in the third position the rack 612 can be located below the gear components 614 and 616. This position of the rack 612 can pull the flexible substrate 620 along with the rack 612, and can cause the flexible display screen 606 to bend toward the rack 612.

Thus, the rack can be held at any one of a number of positions within the rack gear component, such as a first position when the display platforms are in an open position, a second position when the display platforms are in a closed position, and a third position when the display platforms are in a reader position. It is understood that other position are also contemplated and any angle between the closed and reader position are possible.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system comprising:
a flexible display screen supported across a first display platform and a second display platform;
the first display platform hinged to the second display platform via a hinge, the flexible display screen movably mounted to the first and second display platforms;
the hinge including a first gear component operatively coupled to the first and second display platforms and the first gear component oriented to rotate with rotation of the first or second display platform about the hinge;

the hinge including a rack operatively coupled to the first gear component:

a flexible substrate operatively coupled to the rack; and wherein the flexible substrate includes rigid supports to provide support to the flexible display screen, wherein the rack and the first gear component to control support of the flexible display screen via actuation of the rack into a space between the hinge and the flexible display screen such that the rack supports a portion of the flexible display screen and the flexible substrate disposed across the hinge between the first display platform and the second display platform.

2. The information handling system of claim 1, wherein the rack gear component comprises:

a second gear component, the second gear component to be mounted on another one of the first or second display platforms; and the rack to be placed in a first location between the first and second gear components when the first and second display platforms are in an open position, and to be placed in a second location between the first and second gear components when the first and second display platforms are in a closed position.

3. The information handling system of claim 1, wherein the first gear component rotates with respect to the rack in response to the first and second display platforms moving from the open position to the closed position.

4. The information handling system of claim 3, wherein the rack moves between a first location raised in the space between the hinge and the flexible display screen and a second location lowered between the first and second display platforms in response to the rotation of the first gear component.

5. The information handling system of claim 1, further comprising:

the flexible substrate to be mounted between at least one of the first or second display platforms and the flexible display screen the flexible substrate to provide support to the flexible display screen while the flexible display screen is in any of a plurality of positions.

6. The information handling system of claim 5, wherein the flexible substrate comprises:

a flexible material to surround the rigid supports, the flexible material to enable the flexible substrate to bend.

7. The information handling system of claim 6, wherein the flexible substrate is configured to slide along one of the first and second display platforms in response to the first and second display platforms being rotated.

8. An information handling system comprising:

a flexible display screen;

a first display platform hinged to a second display platform via a hinge, the flexible display screen movably mounted to the first and second display platforms;

the hinge including a rack to be actuated into a first location by rotation of a first gear component operatively coupled to one of the first or second display platforms;

the first gear component operatively coupled to the rack and oriented to rotate with the first or second display platform about the hinge to raise the rack into a space between the hinge and the flexible display screen when the first and second display platforms are in an open position;

a flexible substrate in physical communication with the rack, the flexible substrate to provide support to the flexible display screen such that the rack supports a portion of the flexible display screen and the flexible substrate disposed across the hinge between the first display platform and the second display platform; and wherein the flexible substrate includes rigid supports to provide support to the flexible display screen, the rack placed in a second location lowered between the first and second display platforms when the first and second display platforms are in a closed position, wherein the rack causes the flexible display screen to flex when the rack is in the second location and cause the flexible display screen to straighten when the rack is in the first location.

9. The information handling system of claim 8, wherein the rack is placed in a third location between the first and second location in response to the first and second display platforms being placed in a reader position.

10. The information handling system of claim 8, wherein the flexible substrate is configured to slide along one of the first and second display platforms in response to the first or second display platforms being rotated.

11. The information handling system of claim 10, further comprising:

a second gear component to be operatively coupled to another one of the first or second display platforms, and to be operatively coupled to the rack.

12. The information handling system of claim 11, wherein the first and second gear components rotate with respect to the rack in response to the first or second display platforms moving from the open position to the closed position.

13. The information handling system of claim 8, further comprising:

the flexible substrate to be mounted between the first display platform and the flexible display screen to provide support to the flexible display screen while the flexible display screen is in any of a plurality of positions.

14. The information handling system of claim 13, wherein the flexible substrate comprises:

rigid supports to provide support to the flexible display screen; and a flexible material to surround the rigid supports, the flexible material to enable the flexible substrate to bend.

15. The information handling system of claim 14, wherein the flexible substrate is configured to slide along one of the first and second display platforms in response to the first or second display platforms being rotated.

16. An information handling system comprising:

a hinge including a first gear component;

a flexible substrate includes rigid supports to provide support to a flexible display screen of the information handling system, wherein the flexible substrate and the flexible display screen are supported across the hinge between hinged display platforms; and the hinge including a rack operatively coupled to the first gear component and to the flexible substrate, the rack and the first gear component to control support of the flexible display screen via actuation of the rack into a space between the first gear component and the flexible substrate supported across the hinge, wherein the first gear component controls a position of the rack by raising the rack into or lowering the rack from the space between the first gear component and the flexible substrate based from movement of the first gear component when a position of the information handling system is adjusted.

17. The information handling system of claim 16, further comprising:
rigid supports operatively coupled to the flexible substrate, the rigid supports to provide support to the flexible display screen.

18. The information handling system of claim 17, further comprising:
a flexible material to surround the rigid supports, the flexible material to enable the flexible substrate to bend.

19. The information handling system of claim 16, wherein raising the rack into the space between the first gear component and the flexible substrate the center of the flexible substrate is pushed away from the hinge.

20. The information handling system of claim 19, wherein the rack moves between a first location raised in the space between the first gear component and the flexible substrate and a second location lowered from the space between the first gear component and the flexible substrate in response to the information handling system rotating between an open position and a closed position.

* * * * *